UNITED STATES PATENT OFFICE.

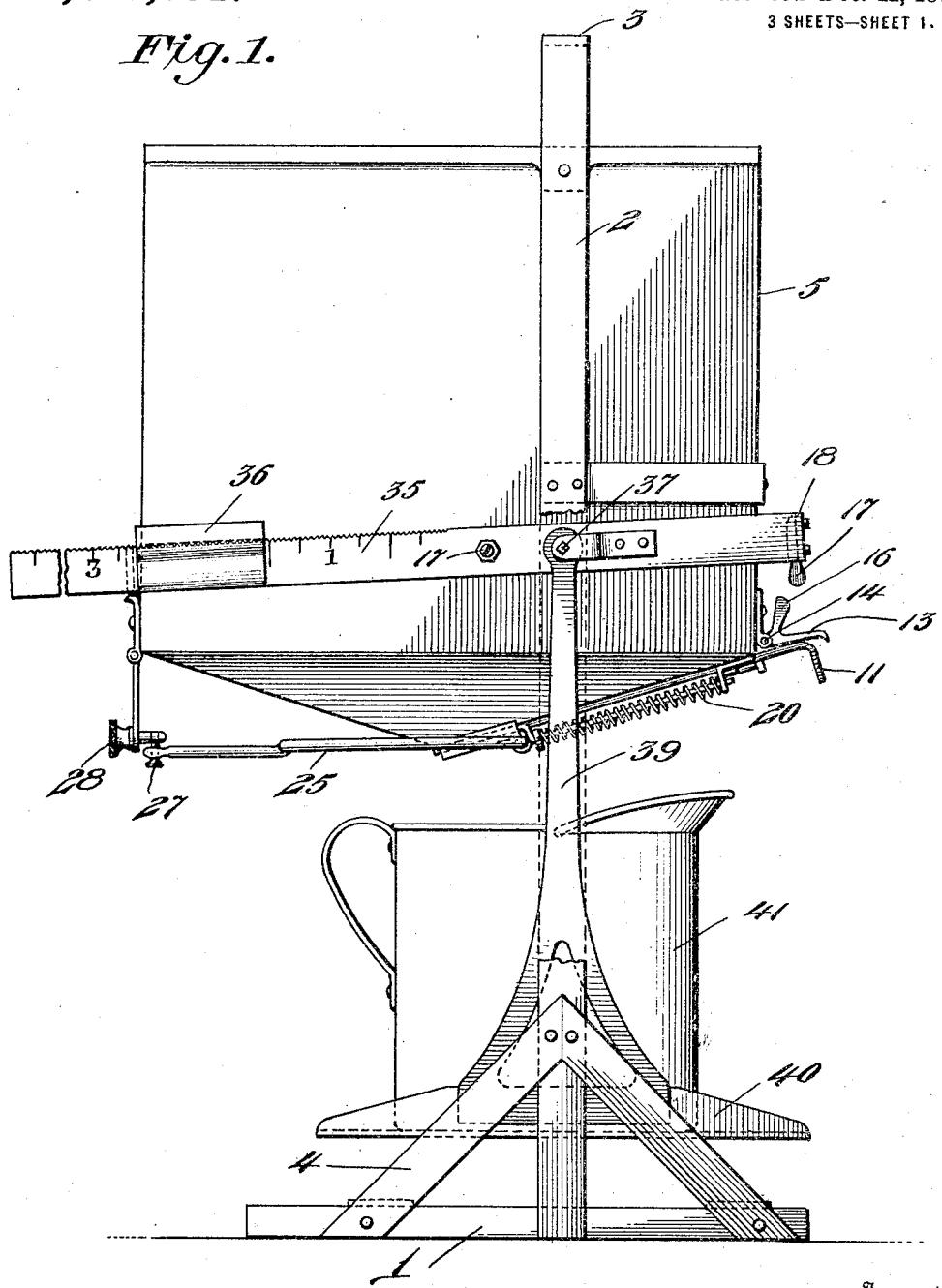

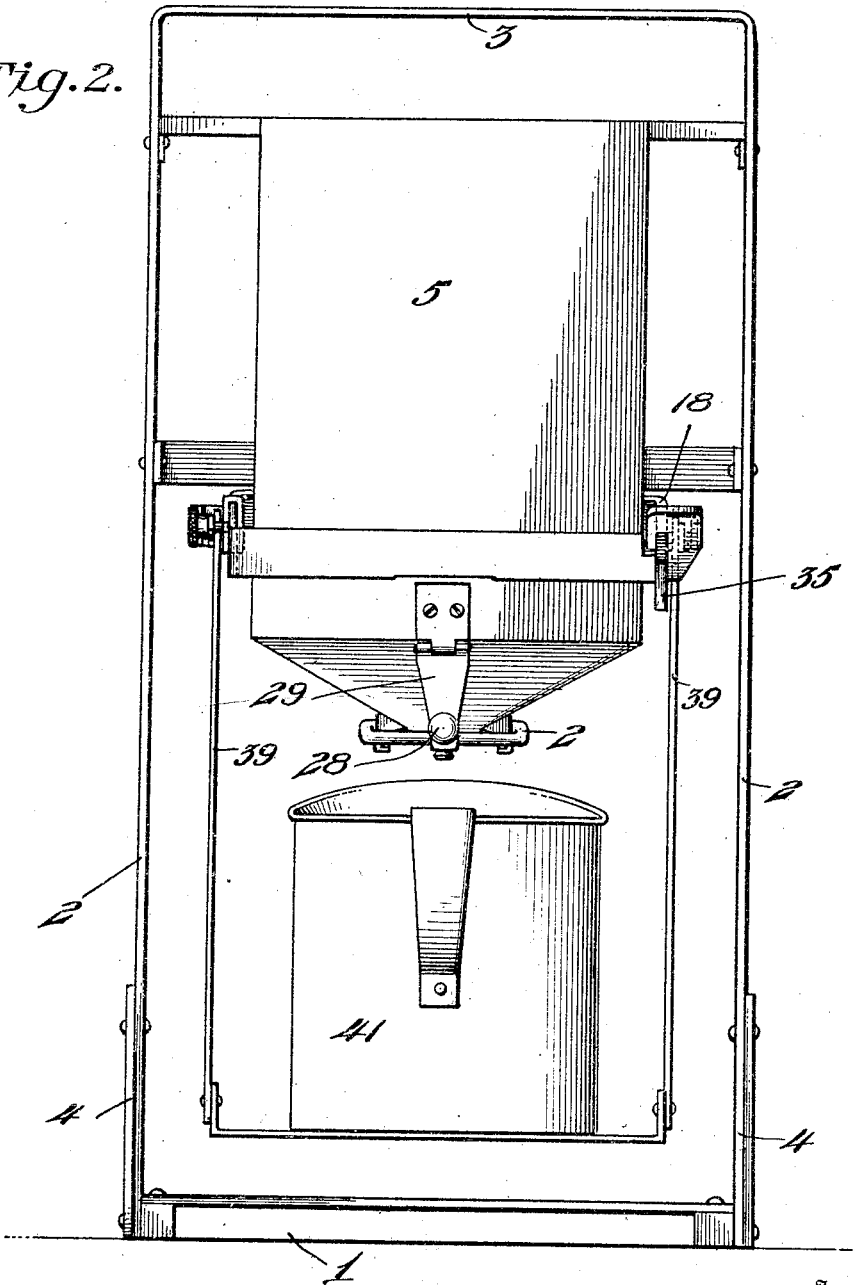

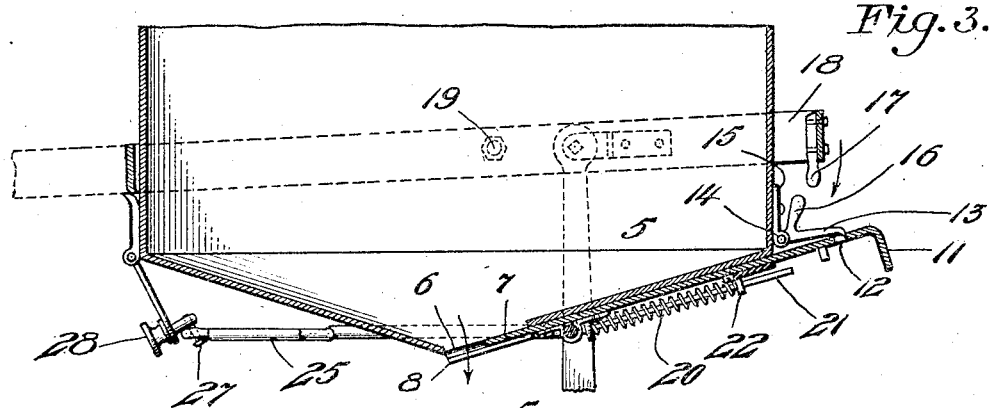
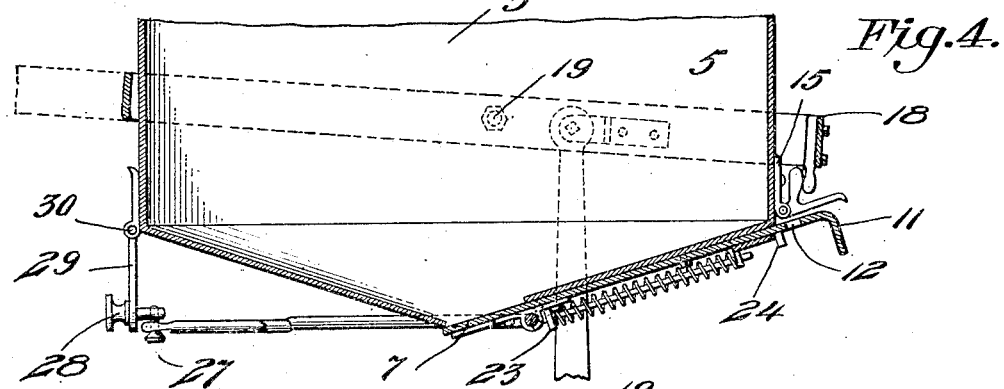
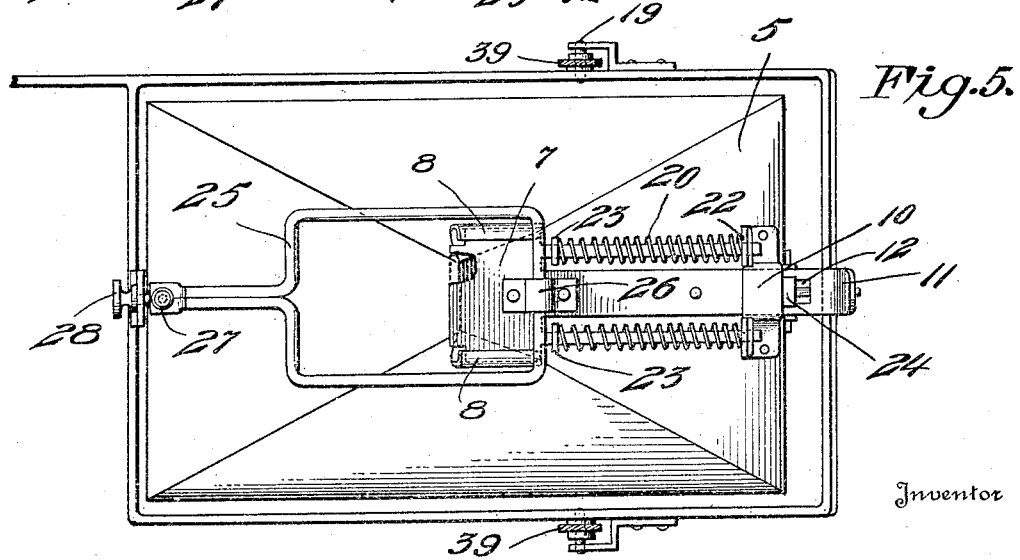

JOLLY L. MORRIS, OF CRAFTON, PENNSYLVANIA.

AUTOMATIC WEIGHING APPARATUS.

1,249,991.     Specification of Letters Patent.     Patented Dec. 11, 1917.

Application filed May 25, 1917. Serial No. 171,002.

*To all whom it may concern:*

Be it known that I, JOLLY L. MORRIS, a citizen of the United States, residing at Crafton, in the county of Allegheny and State of Pennsylvania, have invented certain new and useful Improvements in Automatic Weighing Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in weighing scales and especially in the provision of automatic means for weighing commodities and for cutting off the supply when the desired weight is indicated by the scales.

The invention comprises various details of construction, combinations and arrangements of parts which will be hereinafter fully described, shown in the accompanying drawings and then specifically defined in the appended claims.

I illustrate my invention in the accompanying drawings, in which:

Figure 1 is a side elevation of the apparatus with the exit opening of the hopper closed.

Fig. 2 is a detail view of the apparatus taken in a plane at right angles to Fig. 1.

Fig. 3 is a central vertical sectional view showing the slide regulating the exit opening held open.

Fig. 4 is a view showing the slide closed.

Fig. 5 is a bottom plan view.

Reference now being had to the details of the drawings by numeral, 1 designates the base of the apparatus, and 2 vertical portions of a standard, which have a transverse, horizontally disposed portion 3 and which standard is securely fastened and braced to the bottom or base through the medium of the bars 4. A hopper 5 is secured to said standard and has an exit opening 6 in the lowest part of its tapering bottom, as shown clearly in Fig. 3 of the drawings. A sliding closure 7 is mounted to have a movement between the flange members 8 upon the under side of the hopper and said slide is guided in its longitudinal movements by the contracted portion 9 thereof moving between the strap 10 and the inclined face of the bottom of the hopper, as shown in Fig. 5 of the drawings, the outer end of the contracted portion of said sliding closure being bent at an angle at 11, and 12 is a slot formed in the shank portion of the slot and is adapted to receive one end of the trigger 13 which is mounted upon a pivot 14 mounted in the bracket member 15, secured to the side of the hopper. Said trigger, it will be noted, has a finger 16 projecting therefrom and which is adapted to be positioned in the path of the lug 17 fastened to the pivotal, bail-shaped member 18, which latter is pivotally mounted upon the pin 19. One end of the trigger is adapted to engage the slot 12 in the manner shown in Fig. 3 of the drawings for the purpose of holding the sliding closure 7 in an open position against the tension of the coiled spring 20, which is mounted upon the rod 21 and bears between the lugs 22 upon the strap 10, and lugs 23 projecting from the sliding closure. A lug 24 projects from the contracted portion of the sliding closure and is adapted to contact with the outer edge of the strap 10 to limit the inner throw of the sliding closure.

A bail-shaped member 25 is pivotally mounted upon the sliding closure intermediate the latter and a strap 26, shown clearly in Fig. 5 of the drawings, and the outer ends of the wire forming said bail-shaped member 25 project beyond the end of the rectangular-outlined portion of said bail-shaped member and are pivotally connected to a pin 27 projecting laterally from the inner ends of the screw 28, which is fastened to the plate 29, through the medium of the pivot 30, with the hopper. Said screw 28 serves as a means for pushing in upon the bail-shaped member for the purpose of throwing the slide to an open position, the same being automatically engaged by one end of the trigger 13, in readiness to be sprung as the lug 17, mounted upon the bail-shaped scale member 18. It will be noted upon reference to Fig. 1 of the drawings that one arm 35 of the bail-shaped member 18 has a scale thereon and upon which a weighted member 36 is adjustably held.

Pivotally mounted upon the pins 37, secured to the bail-shaped member 18, are the swinging arms 39 which support the platform 40 upon which a receptacle 41 may be placed underneath the exit end of the hopper.

In operation, the commodity to be measured and which is placed within the hopper is allowed to make exit through the opening 16 when the sliding closure is withdrawn to the position shown in Fig. 3 of the drawings. When a sufficient amount of the commodity being measured enters the receptacle, the platform will tilt and, as the lug 17 comes in contact with the trigger 13, it will tilt the same, releasing its end from the slot in the sliding closure and the coiled spring will throw the closure to the position shown in Fig. 4 of the drawings, thus automatically cutting off the supply. For resetting the closure in an open or retracted position, it may be done either through the medium of the hooked end 11 or the screw 28 which may be pushed inward, causing the bail-shaped member to throw the slide back to its set position.

By the provision of the automatic weighing device shown and described, it will be noted that a simple and efficient means is provided whereby the commodity may be automatically weighed and the supply cut off when the weight tilts the scale.

What I claim to be new is:—

1. An apparatus for automatically weighing commodities, comprising a hopper with an exit opening in the bottom thereof, a sliding, spring-pressed closure regulating the exit opening, a trigger mounted upon the hopper and adapted to engage and hold the sliding closure retracted, a scale beam and weighing platform supported thereby, means upon the beam for tilting the trigger to disengage the same from the sliding closure, a member pivoted to said sliding closure and having swinging pivotal connection with the hopper.

2. An apparatus for automatically weighing commodities, comprising a hopper with an exit opening in the bottom thereof, a sliding spring-pressed closure regulating the exit opening, a trigger mounted upon the hopper and adapted to engage and hold the sliding closure retracted, a scale beam and weighing platform supported thereby, means upon the beam for tilting the trigger to disengage the same from the sliding closure, a bail-shaped member pivoted to said closure and having projecting ends, and a pivotal plate mounted upon the hopper and having pivotal connection with said projecting ends of the bail-shaped member.

3. An automatic weighing apparatus comprising a hopper with an exit opening in the bottom, a weighing scale beam pivotally mounted upon the hopper, a platform having pivotal arms connected to said scale beam, a spring-pressed, sliding closure, guideways in which said closure is mounted, a contracted portion of the latter being provided with a slot, a trigger pivotally mounted upon the hopper and adapted to engage said slot, and a lug upon the scale beam designed to contact with said trigger to release the same from the sliding closure.

4. An automatic weighing apparatus comprising a hopper with an exit opening in the bottom, a weighing scale beam pivotally mounted upon the hopper, a platform having pivotal arms connected to said scale beam, a spring-pressed, sliding closure, guideways in which said closure is mounted, a contracted portion of the latter being provided with a slot, a trigger pivotally mounted upon the hopper and adapted to engage said slot, a lug projecting from the shank portion of the sliding closure, and a strap for guiding the latter and against which strap said lug is adapted to contact to limit the movement of the sliding closure in one direction.

5. An automatic weighing apparatus comprising a hopper with an exit opening in the lower end thereof, guideways upon the bottom of the hopper, a sliding closure movable between the guideways, fingers projecting from said sliding closure, a strap secured to the bottom of the hopper and having slotted lugs through which said fingers move, springs bearing against said lugs and portions of the sliding closure, a trigger adapted to engage and hold the sliding closure retracted, a scale beam pivotally mounted upon the hopper, a lug secured to said beam, adapted to tilt the trigger and throw the same out of engagement with the sliding closure, and a platform pivotally supported upon the scale beam.

In testimony whereof I hereunto affix my signature in presence of two witnesses.

JOLLY L. MORRIS.

Witnesses:
JOSEPH J. BAKEWELL,
ERNEST PAYNE.

Copies of this patent may be obtained for five cents each, by addressing the "Commissioner of Patents, Washington, D. C."